United States Patent Office 2,794,822
Patented June 4, 1957

2,794,822

NOVEL DIBASIC AROMATIC ACIDS AND DERIVATIVES THEREOF

Carl E. Schweitzer, Wilmington, Del., assignor to E. I. du Pont de Nemours and Company, Wilmington, Del., a corporation of Delaware No Drawing. Application May 11, 1953, Serial No. 354,381

6 Claims. (Cl. 260—465)

This invention relates to a novel group of aromatic compounds, namely, compounds of the class consisting of 2,2-bis-(p-carboxyphenyl)propane, 2,2-bis-(m-carboxyphenyl)propane, dimethyl esters of these acids, and 2,2-bis-(p-cyanophenyl)propane, as well as the corresponding m,p-isomers thereof.

The above-mentioned compositions of matter can be prepared from 2,2-ditolylpropanes by methods hereinbelow disclosed (cf. U. S. 2,455,643 for a method for making 2,2-d-p-tolylpropane).

The 2,2-di(tolylpropanes) employed in certain embodiments of this invention are preferably made by reaction between toluene and 2,2-dichloropropane. The latter compound can be produced by reaction of acetone with phosphorus pentachloride. In a preferred procedure, 2,2-dichloropropane is reacted with toluene in the presence of anhydrous aluminum chloride to give a 74% conversion to ditolylpropane with a yield of 80% based on 2,2-dichloropropane.

The desired 2,2-bis(carboxyphenyl)propanes can be obtained from the 2,2-ditolylpropanes by oxidation. In a preferred procedure the 2,2-ditolylpropanes were oxidized with nitric acid, by the method herein described in greater detail, and a mixture of isomeric 2,2-bis(carboxyphenyl)propanes was obtained. When this mixture of acids was fractionally crystallized, fractions with the same neutral equivalent but widely different melting points were obtained. Infra red analysis of the highest melting acid obtained in this fashion (melting point approximately 300° C.) showed that it was almost pure 2,2-bis-(m-carboxyphenyl)propane. The quantity of this m,m-isomer constituted about 20% of the total acid product.

The dimethyl ester of 2,2-bis-(m-carboxyphenyl)propane was obtained by esterifying the entire above-mentioned acidic product with methanol and crystallizing the dimethyl ester of 2,2-bis-(m-carboxyphenyl)propane from a methanol solution of the mixed esterified product. This methyl ester crystallized cleanly leaving the other isomers behind.

After removal of the dimethyl ester of 2,2-bis-(m-carboxyphenyl)propane from the mixture in the manner just described, the resulting product gave on distillation the dimethyl ester of 2,2-bis-(p-carboxyphenyl)propane.

Moreover, pure 2,2-bis-(p-carboxyphenyl)propane and its dimethyl ester were also synthesized by: (1) condensing acetone and aniline in the presence of hydrochloric acid to give 2,2-bis-(p-aminophenyl)propane (13% yield), (2) replacing the amino groups by nitrile groups (48% yield by the Sandmeyer reaction), and (3) hydrolyzing the nitrile with aqueous acid (93% yield of the di-acid in the nitrile hydrolysis step). The dimethyl ester was prepared from the acid thus obtained by esterification in the known manner.

It was also found that pure 2,2-bis-(p-carboxyphenyl)propane could be prepared by alkylation of benzene with dichloropropane followed by acylation of the resulting diphenylpropane with acetyl chloride in the presence of aluminum chloride and oxidation of the 2,2-bis-(p-acetylphenyl)propane with sodium hypochlorite.

In addition to the foregoing methods of preparation, it was discovered also that 2,2-di-p-tolyl propane can be obtained by adding p-methyl-alpha-methyl styrene to toluene with stirring at 25° C. in the presence of a sulfuric acid-mercuric sulfate catalyst. The yield of 2,2-di-p-tolyl propane in the latter process was relatively low (5 to 6% of the theoretical), and the product thus obtained was found to be identical with the 2,2-ditolyl propane obtained from 2,2-dichloropropane and toluene in the presence of aluminum chloride as above-described.

The details of the organic synthesis hereinabove mentioned were as follows:

2,2-DICHLOROPROPANE FROM ACETONE

Into a glass flask which was equipped with a stirring device and an efficient reflux condenser (the outlet of which was attached to Dry Ice traps to collect very volatile halides and thence to HCl absorption trap) was placed 610 grams of phosphorus pentachloride, and acetone (335 grams) was added to the contents of the flask at 0° C. over a period of 0.8 hour. Stirring was continued for 2.8 hours. After completion of the reaction, the reaction flask was surrounded by an ice bath, and a quantity of water (about two liters) was added slowly and cautiously with stirring. (The Dry Ice trap was connected during this operation.) The resulting reaction mixture was transferred to a separatory funnel and the oil layer was allowed to separate. The aqueous layer was discarded and the oil layer was washed three times with cold saturated sodium sulfate aqueous solution. Finally, the oil layer was dried by means of calcium chloride. The first Dry Ice trap was removed from the Dry Ice, and one opening was closed while the other was connected to the other ice trap in a Dry Ice bath. The uncooled bath was permitted to warm to 30° after which the liquid remaining in it was washed three times with 50 cc. portions of cold saturated aqueous sodium sulfate solution. The oil layer thus obtained was added to the oil layer, above-mentioned, drying over calcium chloride. The weight of material which distilled out of the cold trap upon warming to 30° C. was 18.5 grams. Distillation of the liquid which had been dried over calcium chloride gave 88 grams of 2,2-dichloropropane having a boiling range of from 65° to 70° C.

CONDENSATION OF TOLUENE WITH 2,2-DI-CHLOROPROPANE

Example 1.—To 276 grams of toluene and 17 grams of anhydrous aluminum chloride was added 56.5 grams of 2,2-dichloropropane with stirring at a temperature of 0° C. over a period of 0.3 hour. Stirring the reaction mixture was continued at this temperature for an additional four hours. The complexes in the reaction mixture were then decomposed by stirring in 200 cc. aqueous 10% hydrochloric acid. The layers were allowed to separate and the aqueous layer was discarded. The oil layer was washed four times with an equal volume of water and then distilled at atmospheric pressure until the head temperature reached 125° C. Distillation of the residue under reduced pressure gave 75.9 grams of ditolylpropane having a boiling point in the range of 105° to 130° C. under a pressure of 2.4 to 3.2 mm. The refractive index of the lowest boiling part of this fraction ($n_D^{20}$) was 1.5599 and the corresponding refractive index for the highest boiling part of the fraction was 1.5596.

Example 2.—Over a period of 0.2 hour, 3.4 grams of anhydrous aluminum chloride was added at 0° C. to a stirred mixture consisting of 49.2 grams of toluene and 11.3 grams of 2,2-dichloropropane. The product was worked up as above-described. The 2,2-ditolylpropane fraction which distilled mostly at 118° to 121°

C. under a pressure of 3 mm. was analyzed and was found to contain 91.46% C and 8.86% H (calculated values for ditolylpropane: C=91.01, H=8.99).

*Example 3.*—A catalyst was prepared by stirring 50 g. of aluminum chloride and 300 ml. of toluene at 23° C. while HCl was bubbled through the mixture until the solid aluminum chloride entirely disappeared. The mixture was poured into a separatory funnel and the dark colored liquid layer separated. This catalyst layer weighed 172 g. and roughly corresponded to the composition $AlCl_3 \cdot HCl \cdot C_7H_8$. A solution of 1 mol of 2,2-dichloropropane and 4 mols of toluene which had been cooled to 0° C. was added to the flask containing 12 g. of the above catalyst (2.5 mol percent). The resulting mixture was agitated in a creased flask by stirring at 8,000 R. P. M. with a stainless steel propeller, the temperature being maintained at 5° C. with an ice bath. Evolution of hydrogen chloride began immediately and amounted to 54% of the calculated value after 90 minutes. The mixture was transferred to a separatory funnel and the catalyst layer recovered. After washing with water and 5% sodium hydroxide, the toluene layer was dried over calcium chloride. Distillation at atmospheric pressure produced 474 g. of distillate containing 8.9 mol percent of dichloropropane. Distillation of the residue under reduced pressure gave 133.5 g. of 2,2-bis-(tolyl) propane boiling at 99–102° C./0.2 mm., corresponding to 80% yield and 74% conversion based on dichloropropane. Infrared analysis indicated that the 2,2-bis-(tolyl)propane contained 90% para substitution. In a similar experiment using 5 mol percent catalyst and stirring for one hour, there was obtained a 78% yield of 2,2-bis-(tolyl)propane in 86% conversion from dichloropropane.

PREPARATION OF 2,2-BIS-(CARBOXYPHENYL) PROPANES

A. Oxidation of 2,2-ditolylpropane

A mixture consisting of 15 grams aqueous 70% nitric acid, 0.1 gram $NH_4VO_3$, 15 grams water, and 4.5 grams ditolylpropane (prepared as above-described) was heated at 100° C. for 40 hours in a flask equipped with a reflux condenser. The resulting mixture was cooled and filtered after which the solid filter-cake was broken up and washed well with water. It was then dissolved in a 25% excess of aqueous 20% sodium hydroxide solution. The solution thus obtained was extracted with 50 cc. diethyl ether which removed a few tenths of a gram of sweet-smelling yellow sticky oil which could be isolated by evaporation of the ether from the extract. The aqueous phase was again filtered and acidified with aqueous 15% HCl with vigorous stirring. This caused the precipitation of a gummy mass. Upon washing this with water and drying it in air, a dry acid was obtained. Attempts to fractionally crystallize this acid from glacial acetic acid gave crystalline products having a wide range of melting points but the same neutral equivalent, namely, 140–143. Four batches of crystals were obtained by successively removing acetic acid from a heated solution of the solid mass, followed by cooling the resulting solution. The first batch had a melting point of 278° to 284° C. and the last batch to crystallize had a melting point of 297° to 299° C. The latter material by infrared analysis (comparison of infrared spectrum with the spectrum of known metacarboxy compounds) was shown to be 2,2-bis-(m-carboxyphenyl)propane.

It will be apparent from the disclosures contained hereinafter that the p,p'-isomer is actually higher melting than the m,m'-isomer prepared as above described, the reason for the higher melting point of the m,m'-fraction here being the absence therein of substantial amounts of other isomers in the purified m,m' product.

B. Synthesis of 2,2-bis-(p-carboxyphenyl)propane from 2,2-bis(p-aminophenyl)propane A mixture consisting of 185 grams of aniline and 675 grams of water was mixed with a sufficient quantity of concentrated hydrochloric acid to cause the aniline to dissolve. The resulting solution was cooled and introduced into a shaker tube with 40 grams of acetone. The tube contents were heated at 145° under autogenous pressure for 6 hours after which the mixture was cooled and made alkaline by the addition of a solution of 150 grams of sodium hydroxide in 500 cc. of water. This alkaline mixture was extracted with five 200 cc. portions of ether. The ether extracts were combined and washed with three 500 cc. portions of aqueous saturated sodium sulfate solutions. After this the ether solution was dried over NaOH and filtered. The ether was evaporated on a steam bath and the residue was mixed with 10 grams $K_2CO_3$ and distilled under diminished pressure. The fraction boiling at 200° to 231° at a pressure of 5.5 mm., was recrystallized from benzene to give 20.2 grams of a yellow solid having a melting point of 128.2 to 129.6° C. This was pure 2,2-bis-(p-aminophenyl)propane. 18 grams of this material was stirred into 50 cc. of aqueous 35% HCl. Ice (150 grams) was added to the reaction mixture and the temperature was kept at —5 to 0° C. by adding ice and by keeping the mixture surrounded by an ice bath. While maintaining the mixture at this temperature a solution of 16 grams sodium nitrite in 40 cc. water was added with stirring over a period of 10 minutes. Stirring was continued for an additional 15 minutes after which 10 grams sodium carbonate was slowly added, which made the solution neutral to litmus. A cuprous cyanide solution was prepared by adding 32.5 sodium cyanide in 50 cc. water to a stirred mixture of 22.5 grams cuprous cyanide and 100 cc. water surrounded by an ice bath. 50 cc. benzene was added to this cuprous cyanide solution and it was stirred and kept at 0° by the addition of ice while the neutral solution just described was gradually added over a period of 30 minutes. The resulting mixture was stirred for one hour at 0° and then allowed to warm to room temperature over a period of another hour. After this, it was stirred at 25° for 90 minutes and at 50° for 5 minutes. The resulting mixture was extracted with two 200 cc. portions of benzene and the combined benzene washes were washed successively with 200 cc. saturated aqueous sodium sulfate solution, 200 cc. aqueous 10% NaOH solution, 200 cc. aqueous saturated sodium sulfate, 200 cc. 20% $H_2SO_4$, and four 200 cc. portions of aqueous saturated sodium sulfate. The remaining solution was filtered and the benzene was evaporated while keeping the temperature below 100° C. The residue was distilled and 10 grams of a fraction having a boiling range of 220° to 230° C. at a pressure of 3.8 mm. was obtained. Crystallization of this fraction from methanol gave 9.7 grams pale yellow crystals having a melting point of 138.5° to 140° C. Further recrystallization gave 9.3 grams cream colored crystals having a melting point of 139.2 to 140.5° C. This material was found to contain 11.3% nitrogen (calculated for 2,2-bis-(p-cyanophenyl)propane, 11.39%).

A mixture of 9.0 g. of this 2,2-bis-(p-cyanophenyl) propane and 200 cc. aqueous 75% $H_2SO_4$ was heated with stirring at 140° to 150° C. for three hours. The temperature was then raised to 190° C., and heating was continued at that temperature for 1.5 hours. After this, the mixture was cooled and added to 400 cc. of ice water. The resulting precipitate was removed by filtration and washed well with water. It was dissolved in a solution of 10 grams NaOH in 200 cc. water and the solution was filtered and heated to boiling. To the boiling solution 50 cc. aqueous 35% HCl admixed with 50 cc. water was added slowly and a precipitate was obtained. This precipitate was digested for 30 minutes at 100°. The mixture was then cooled and filtered and the filter cake was washed well with water and finally air dried. The dry acid was recrystallized and decolorized (by means of charcoal) from glacial acetic acid twice. The yield of 9.5 grams white crystals (melting point 314° C., neutralization equivalent=142.5). This pure 2,2-bis-(p-carboxyphenyl)propane sublimed sharply at 310° under a pressure of 2 mm. to give well formed crystals.

C. Synthesis of 2,2-bis-(p-carboxyphenyl)propane from 2,2-diphenylpropane

A mixture of 2200 ml. of benzene and 81.0 g. of aluminum chloride was cooled to 5° C. and 250 g. of dichloropropane added dropwise over 1 and ½ hours at a rate such that the temperature did not rise above 5° C. An additional 28 g. of aluminum chloride was added all at once and the mixture stirred at 10-20° C. for an addition 1 and ½ hours. The reaction mixture was decomposed by pouring slowly with stirring into one liter of ice water. After separating, the organic layer was washed with 1 liter of 25% aqueous potassium carbonate solution for 30 minutes. The organic layer was separated, dried over anhydrous sodium sulfate, and benzene removed by distillation at atmospheric pressure until the temperature reached 130° C. The residual yellow liquid was distilled under reduced pressure over 5 g. of potassium hydroxide to give 201.3 boiling at 90-95° C./1 mm., $n_D^{25}$ 1.5692 for a yield of 47% based on 2,2-diphenylpropane from dichloropropane. One liter of acetyl chloride was cooled to —50° C. and 608 g. of aluminum chloride added over 30 minutes during which time the temperature rose to —30° C. The 2,2-diphenylpropane (200 g.) was added in a thin stream over a 15-minute interval during which time the temperature rose to —25° C. While the reaction mixture was stirred the temperature was permitted to rise to 0° C. over 1 hour, then the mixture was decomposed by pouring onto 5 kg. of stirred, crushed ice. The granular solids were then stirred for 1 hour longer, collected by filtration, washed with 2 liters of water in the Waring Blendor and sucked dry on the filter. After drying overnight under vacuum, there was obtained 343.9 g. of crude material. This was dissolved in 4 liters of methylcyclohexane, treated with activated carbon and filtered hot through absorbent clay. The diketone, 2,2-bis-(p-acetylphenyl)propane, crystallized upon cooling as thin, irregular plates. There was obtained in this manner 130.1 g., M. P. 65–75° C. and 30.1 g., M. P. 66–68° C. for a total of 150.2 g. for a yield of 58% based on diphenylpropane. Further condensation of the filtrates gave only a mobile tan oil. The 2,2-bis-(p-acetylphenyl)propane was oxidized by adding a solution of 150 g. of the compound in 490 ml. of dioxane to a stirred solution of sodium hypochlorite prepared by bubbling 265 g. of chlorine into a solution of 450 g. of sodium hydroxide in 2.1 liters of distilled water. The oxidation was moderated with an ice bath so as to keep the temperature between 35 and 40° C. After 30 minutes, the cooling bath was removed and the milky suspension stirred for 12 hours at room temperature. The reaction mixture was extracted with two 500 ml. portions of carbon tetrachloride, whereupon the sodium salt of 2,2-bis-(p-carboxyphenyl)propane precipitated in the aqueous layer. This was collected by filtration, dissolved in 4 liters of water and treated with activated carbon. After removing the carbon by filtration, the hot solution was saturated with sodium chloride and allowed to cool overnight. The sodium salt of 2,2-bis-(p-carboxyphenyl)propane crystallized as long fine needles. This was collected by filtration, dissolved in 4 liters of hot water at 70° C. and acidified by adding slowly with rapid stirring 500 ml. of 1:1 aqueous solution of hydrochloric acid. After cooling in an ice bath to 10° C., the precipitated acid was collected by filtration, washed with ice cold water until free of chloride ion and dried at 145° in vacuum for 12 hours. In this manner, there was obtained 135.0 g. of crude acid. Acidification of the combined alkaline filtrates gave an additional 14.9 g. for a total of 149.9 g. corresponding to a 2,2-bis-(p-carboxyphenyl)propane yield of 91% based on 2,2-bis-(p-acetylphenyl)propane. The crude acid was dissolved in 6 liters of hot ethanol. After treating with activated carbon, the solution was filtered and two liters of alcohol removed by distillation. Hot water was added until the solution became faintly turbid. Upon cooling, the acid separated as long, fine needles. In this manner there was obtained three crops for a total of 135.7 g., M. P. 315–316° (90% recovery).

DIMETHYL ESTER OF 2,2-BIS-(m-CARBOXYPHENYL)PROPANE

To 3 grams of 2,2-bis-(m-carboxyphenyl)propane prepared as above-described was added 75 cc. methanol and the resulting solution was saturated with dry hydrogen chloride. The solution thus obtained was heated under refluxing conditions for three hours after which the methanol was distilled off. The residue was cooled and four times its volume of water was added. The aqueous solution was extracted twice with 60 cc. ether. The combined ether extracts were washed successively with 100 cc. water, 100 cc. aqueous 10% $K_2CO_3$ and four 100 cc. portions of water. The ether solution was then dried over sodium sulfate and the ether was finally evaporated. The residue was dissolved in an equal volume of hot methanol and the product was separated after cooling the methanol solution. This product was recrystallized and clarified with activated charcoal using a methanol solvent to give purified dimethyl ester of 2,2-bis-(m-carboxyphenyl)propane (weight 2.5 grams) having a melting point of 115.8° to 116.1° C. Analysis of the product showed that it contained 72.84% C and 6.18% H. (Calculated for the dimethyl ester: C=73.06, H=6.45.)

DIMETHYL ESTER OF 2,2-BIS-(p-CARBOXYPHENYL)PROPANE

A mixture of 6.0 grams 2,2-bis-(p-carboxyphenyl)propane (prepared as above-described) and 100 cc. methanol was saturated with dry hydrogen chloride and the resulting solution was heated under refluxing conditions for 3.5 hours. The reaction mixture was then worked up in the manner described above in connection with the preparation of the dimethyl ester of 2-2-bis-(m-carboxyphenyl)propane. The solid which was obtained upon evaporation of ether from the ether solution was recrystallized and decolorized using methanol as a solvent medium and in this manner 5.9 grams of the dimethyl ester of 2,2-bis(p-carboxyphenyl)propane was obtained, M. P. 101–102° C. Further recrystallization did not raise the melting point of this ester. A mixed melting point of this ester with the dimethyl ester of 2,2-bis-(m-carboxyphenyl)propane (melting point 115.5 to 116.5° C.) was found to be 86.2° to 96.8° C.

It will, of course, be understood that the present invention is not limited to the methods of preparation hereinabove described. The specific procedures can, of course, be varied within the skill of the ordinary organic chemist. For example, various known techniques for carrying out Friedel-Crafts type reactions may be applied in the synthesis of ditolylpropanes from 2,2-dichloropropane and toluene, and the methods which have been employed heretofore for working up hydrocarbon-containing Friedel-Crafts reaction products are, of course, applicable in the separation of ditolylpropanes from the reaction mixture. The oxidation of the mixed ditolylpropanes with aqueous nitric acid is not necessarily carried out under refluxing conditions as hereinabove illustrated but may also be carried out in a closed reaction vessel and at considerably higher temperatures, i. e., at temperatures within the range 100° to 200° C. or higher. The concentration of aqueous nitric acid which is employed in the oxidation can be varied somewhat but it is preferable to employ relatively dilute nitric acid when optimum yields are desired, if relatively low temperatures are employed. On the other hand, if relatively high temperatures are employed, e. g. 170° to 180°, good yields are obtainable even when a highly concentrated nitric acid (e. g. 70% or higher) is employed. It is generally not desirable to employ a highly concentrated nitric acid at a relatively low temperature since this results in loss of the reactant due to the formation of nitro compounds.

It is apparent that the synthesis of 2,2-bis(p-cyanophenyl)propane hereinabove described (method B) takes place through the intermediate formation of a diazonium compound and, of course, the usual precautions which are commonly used to prevent the decomposition of the diazonium compounds should be employed during the diazotization of the diamine and the conversion to diazonium cyanide. For example, the temperature should be kept as low as possible during these steps and in any event should not be permitted to rise above about 10° C. if optimum yields are to be obtained.

Any of the methods which have been employed heretofore for converting nitriles to the corresponding acids may be used in the conversion of 2,2,-bis-(p-cyanophenyl)-propane to 2,2-bis-(p-carboxyphenyl)propane. The procedure hereinabove described is, however, believed to be the best method of carrying out this step since it is capable of giving a yield of acid exceeding 90% of the theoretical. The acid, 2,2-bis-(p-carboxyphenyl)propane, can be converted back to the dinitrile by reaction with ammonia at high temperatures, under the conditions well known in the art for converting adipic acid to adiponitrile.

The conversion of 2,2-bis(p-carboxyphenyl)propane to the corresponding dimethyl esters can be accomplished by the use of methylating agents other than methanol. Suitable methylating agents include methyl hydrogen sulfate, dimethyl sulfate, diazomethane, etc.

The products obtained in accordance with the present invention are especially valuable and useful in the manufacture of polyamide resins having exceptional properties. These polyamide resins are disclosed in greater detail in the copending application of C. E. Schweitzer, S. N. 373,432, filed August 10, 1953. Moreover, the dimethyl esters can be converted to ethylene glycol polyesters having attractive properties. For example, the dimethyl ester of 2,2-bis-(p-carboxyphenyl)propane is heated with litharge and an excess of ethylene glycol in the presence of nitrogen at 217° C. until nearly all of the methanol has been removed, and the resulting mixture is subjected to the full vacuum of the pump for about 30 minutes more to draw off most of the excess glycol. Temperature is then raised to 260° C., vacuum is maintained and polymerization is continued for several hours. A high molecular weight polyester is obtained.

The dimethyl esters of 2,2-bis(carboxyphenyl)propane are also useful in that they can be converted by reduction (e. g. by LiAlH$_4$ in anhydrous diethyl ether) to the corresponding glycol, e. g., 2,2-bis-(p-hydroxymethylphenyl)propane. The latter glycol obtained in this manner after recrystallization from benzene was in the form of shining white needles having a melting point of 129.9 to 130.9° C. A solution of 2.0 grams of this dihydroxy compound in 100 cc. chloroform upon saturation with HCl gas for one hour and drying the resulting mixture over calcium sulfate for 8 hours gave upon evaporation of the chloroform under reduced pressure a crystalline product, namely, 2,2-bis-(p-chlorophenyl)propane which on recrystallization from benzene mixture had a melting point of 49.1° to 50° C.

As hereinabove indicated, the outstanding utility of the compositions obtained in accordance with this invention resides in the exceptional or unique character of the polyamide resins obtainable therefrom. This is especially true of the polyamides derived from hexamethylenediamine and the 2,2-bis-(carboxyphenyl) propanes. The polyamides prepared from hexamethylene diamine and the p,p' and m,m' isomers were manually spinnable and had stick temperatures (i. e. melting point as determined by measuring the temperature at which the polymer begins to stick on a surface of heated material) of 185° and 165° C. respectively. The amorphous polyamides prepared from hexamethylene diamine and bis-(carboxyphenyl)propane (either the p,p' acid or a mixture of the p,p'; m,m'; and m,p acids) had outstanding mechanical properties at elevated temperatures. Eighty percent of the room temperature stiffness was retained at 143° C. in the case of the p,p' polyamide. This excellent retention of stiffness, combined with low creep, high impact strength, good recovery in flexural hysteresis, and low energy absorption at vibrational frequencies, together with the fact that the polymeric products are obtainable in a sparklingly clear colorless form, make this variety of polyamide outstanding as a thermoplastic material for mechanical applications.

I claim:
1. A compound of the class consisting of 2,2-bis-(p-carboxyphenyl)propane, 2,2 - bis - (m - carboxyphenyl)-propane, dimethyl ester of 2,2-bis-(p-carboxyphenyl)propane, dimethyl ester of 2,2-bis-(m-carboxyphenyl)propane, and 2,2-bis-(p-cyanophenyl)propane.
2. 2,2-bis-(m-carboxyphenyl)propane.
3. 2,2-bis-(p-carboxyphenyl)propane.
4. Dimethyl ester of 2,2 - bis - (m - carboxyphenyl)-propane.
5. Dimethyl ester of 2,2 - bis - (p - carboxyphenyl)-propane.
6. 2,2-bis-(p-cyanophenyl)propane.

References Cited in the file of this patent
UNITED STATES PATENTS

| | | |
|---|---|---|
| 2,563,820 | Darragh et al. | Aug. 14, 1951 |
| 2,570,038 | Smith et al. | Oct. 2, 1951 |
| 2,612,516 | Heimsch et al. | Sept. 20, 1952 |
| 2,635,114 | Schlatter | Apr. 14, 1953 |
| 2,640,975 | Goedkoop | May 26, 1953 |
| 2,677,703 | Toland | May 4, 1954 |
| 2,712,543 | Gresham et al. | July 5, 1955 |

OTHER REFERENCES

Mitter: Ber. Deut. Chem., vol. 45, pp. 1208–9 (1912).
Duval: Beilstein's Handbuch der Organischen Chemie, vol. 9, p. 929 (1926).
Sisido et al.: 35 C. A., vol. 1026 (1944).
Thomas: Anhydrous Aluminum Chloride in Org. Chemistry, p. 110 (1941).